(12) United States Patent
Hummel et al.

(10) Patent No.: US 7,500,928 B2
(45) Date of Patent: Mar. 10, 2009

(54) RANDOMIZED CHAIN SYSTEM

(75) Inventors: John Hummel, Lansing, NY (US); Roger Butterfield, Trumansburg, NY (US)

(73) Assignee: BorgWarner Inc., Auburn Hills, MI (US)

( * ) Notice: Subject to any disclaimer, the term of this patent is extended or adjusted under 35 U.S.C. 154(b) by 693 days.

(21) Appl. No.: 11/039,608

(22) Filed: Jan. 20, 2005

(65) Prior Publication Data

US 2006/0160648 A1   Jul. 20, 2006

(51) Int. Cl.
*F16G 13/02* (2006.01)

(52) U.S. Cl. .................. 474/230; 474/231; 474/228; 474/229

(58) Field of Classification Search ................ 474/230, 474/206, 231, 228, 229, 153–157
See application file for complete search history.

(56) References Cited

U.S. PATENT DOCUMENTS

| | | | |
|---|---|---|---|
| 689,764 A | 12/1901 | Titus | |
| 799,074 A | 9/1905 | Morse | |
| 1,953,388 A | 4/1934 | Bettin | |
| 2,199,292 A | 4/1940 | Pierce | 74/245 |
| 2,489,039 A | 11/1949 | Law | 74/245 |
| 3,597,985 A | 8/1971 | Jeffrey | 74/229 |
| 4,227,422 A | 10/1980 | Kawashima et al. | 474/156 |
| 4,342,560 A | 8/1982 | Ledvina et al. | 474/157 |
| 5,176,585 A * | 1/1993 | Novak | 474/206 |
| 5,192,252 A | 3/1993 | Skurka et al. | 474/210 |
| 5,226,856 A | 7/1993 | Iacchetta et al. | 474/207 |
| 5,267,909 A | 12/1993 | Iacchetta | 474/206 |
| 5,306,212 A | 4/1994 | Eberle | 474/140 |
| 5,320,582 A | 6/1994 | Takeda | 474/140 |
| 5,397,280 A | 3/1995 | Skurka | 474/206 |
| 5,697,486 A | 12/1997 | Krampl | 198/332 |
| 5,921,879 A | 7/1999 | Young | 474/202 |
| 5,938,554 A | 8/1999 | Moster et al. | 474/209 |
| 5,976,045 A | 11/1999 | Young | 474/160 |
| 5,997,424 A | 12/1999 | Young | 474/156 |
| 6,036,614 A | 3/2000 | Baddaria | 474/155 |
| 6,090,003 A | 7/2000 | Young | 474/160 |
| 6,155,943 A | 12/2000 | Ledvina et al. | 474/156 |
| 6,179,741 B1 | 1/2001 | Young | 474/161 |
| 6,213,905 B1 | 4/2001 | White et al. | 474/148 |
| 6,325,724 B1 | 12/2001 | Sato et al. | 464/229 |
| 6,371,875 B2 | 4/2002 | Young | 474/161 |
| 6,575,861 B2 | 6/2003 | Markley et al. | 474/156 |

(Continued)

FOREIGN PATENT DOCUMENTS

DE   1030122   5/1958

(Continued)

*Primary Examiner*—Robert A Siconolfi
*Assistant Examiner*—James K Hsiao
(74) *Attorney, Agent, or Firm*—Brown & Michaels, PC

(57) ABSTRACT

A chain and a chain and sprocket assembly for a roller, bush, or inverted tooth chain is disclosed. The chain has at least two types of link plates having different profiles, with at least one type of link plate having a leading corner for interaction with a contact ring on the sprocket, thereby reducing noise by reducing chordal action and by breaking up the regular timing of roller-sprocket (or bushing-sprocket) and link plate-sprocket impact. A method of reducing noise in a chain and sprocket assembly is also disclosed.

28 Claims, 10 Drawing Sheets

U.S. PATENT DOCUMENTS

| | | |
|---|---|---|
| 2002/0119853 A1 | 8/2002 | Horie |
| 2005/0130780 A1* | 6/2005 | Carolina Korse ............ 474/230 |
| 2006/0079363 A1* | 4/2006 | Miyazawa .................. 474/206 |

FOREIGN PATENT DOCUMENTS

| | | |
|---|---|---|
| DE | 3542198 | 6/1987 |
| DE | 19543287 | 6/1997 |
| DE | 10105224 | 8/2002 |
| EP | 0492404 B1 | 10/1997 |
| EP | 0778428 B1 | 3/1999 |
| EP | 1036953 A1 | 9/2000 |
| EP | 1184593 A1 | 8/2001 |
| EP | 1102718 B1 | 10/2002 |
| EP | 1304302 A1 | 4/2003 |
| GB | 821480 A1 | 6/1957 |
| JP | 61-171942 | 8/1986 |
| JP | 2004162917 | 6/2004 |
| WO | WO 97/31846 | 9/1997 |
| WO | WO 03/093700 | 11/2003 |

* cited by examiner

RANDOMIZED CHAIN SYSTEM

BACKGROUND OF THE INVENTION

1. Field of the Invention

The invention pertains to the field of chains. More particularly, the invention pertains to a chain and sprocket assembly including a sprocket contact ring and link plates having a leading corner randomized with link plates having a different profile.

2. Description of Related Art

For roller, bush, and inverted tooth chains, noise reduction in a chain and sprocket assembly has been achieved in two separate, unrelated ways in the prior art. In the first way, chordal action, also called the polygon effect, is reduced by creating an additional surface to contact the chain. The polygon effect leads to undesirable oscillations and vibrations, which increase the operational noise of a system. The additional contact surface with the chain may have the added advantage of reducing the volume of operational noise by reducing the impact force between the chain and the teeth of the sprocket. These chain and sprocket assemblies reduce noise arising from chordal action, but they have an objectionable whine noise caused by the regular timing of impact between the chain and the sprocket.

Early incorporation of an additional contact surface reduced friction and wear on the chain, rather than operating noise. The additional contact surface in U.S. Pat. No. 689,764 MECHANISM FOR TRANSMITTING POWER AND MOTION, issued Dec. 24, 1901 to Titus et al., minimizes the friction between the chain and the sprocket. The additional contact surfaces in U.S. Pat. No. 799,074, DRIVE CHAIN, issued Sep. 12, 1905 to Morse, reduce wear on the sprocket teeth and the chain rollers.

In U.S. Pat. No. 1,953,388, TRUSS CHAIN, issued Apr. 3, 1934 to Bettin, the chain has trusses to reduce chordal action.

In U.S. Pat. No. 2,199,292, HEAVY DUTY DRIVE CHAIN, issued Apr. 30, 1940 to Pierce, the chain has teeth, in addition to rollers, to provide a second contact means with a sprocket and to reduce chordal action.

In U.S. Pat. No. 2,489,039, CHAIN AND SPROCKET ASSEMBLY, issued Nov. 22, 1949 to Law, for each roller, the chain has a finger, which interacts with a complementary surface between the sprockets to reduce chordal action.

In U.S. Pat. No. 3,597,985, FLEXIBLE POWER TRANSMISSION DRIVE, issued Aug. 10, 1971 to Jeffrey, the sprocket and cooperating chain, shown as an inverted tooth chain, have a mismatched pitch and are provided with complementary engaging surfaces. The sprocket has a shoulder support surface or contact ring. This provides a smooth transitional engagement between the chain and the sprocket and causes the chain to move with the sprocket along a constant sprocket-pitch radius. The guide links have a transitional surface with a radius equal to the distance between the most adjacent pin of the chain and the band support surface at a point tangent to the transitional surface. The transitional surface of the guide links provides a constant radius of engagement between the guide links and the sprocket shoulder support surface.

In WO 03/093700, CHAIN TRANSMISSION AND CHAIN, published Nov. 13, 2003 by Korse et al., the chain is designed to counteract the polygon effect. The chain transmission includes support means for guiding the chain links such that a pivot axis is always at a constant speed when the wheel is rotating at a constant speed. The support means includes a support, which rotates with the wheel. Support surfaces are arranged on the links. The distance between the axis of rotation and the pivot axis is variable.

In the second method of noise reduction, randomization of some aspect of the chain and sprocket assembly is implemented to reduce operational noise. Roller, bush, and inverted tooth chain systems typically exhibit an objectionable whine noise caused by the regular timing of impact, as the individual chain pitches engage the sprocket. Randomization of the chain pitch and of the material of the sprocket-contacting part of the chain is known in the prior art. Randomization modifications do not reduce the noise arising from chordal action, and randomization of the link plate profile is not present in the prior art.

In U.S. Pat. No. 5,192,252, ROLLER CHAIN WITH RANDOMIZED PITCH, issued Mar. 9, 1993 to Skurka et al., the roller chain is provided with sets of links constructed of unequal pitch in order to alter the pattern of contacts between the chain and the sprocket and the resulting noise spectrum. The varying pitch lengths through the chain are achieved by varying the length of either the inside links or the outside links. Alternatively, the sizes and configurations of the rollers are varied. Configurations can include circular, elliptical, or triangular rollers. The pattern of variation of the pitch of the links is randomized throughout the chain.

In U.S. Pat. No. 5,226,856, ROLLER CHAIN CONSTRUCTED WITH NYLON ROLLERS, issued Jul. 13, 1993 to Iacchetta et al., the roller chain is provided with links having some rollers made of nylon. The rollers are arranged with conventional metallic rollers in patterns along the length of a single-strand or double-strand roller chain. The nylon is poly(tetramethylene adipamide). The nylon rollers are placed randomly throughout the chain or in a prescribed random pattern in an effort to modify the noise spectrum.

There is a need in the art for a chain and a chain and sprocket assembly, which reduces operational noise by reducing chordal action and by reducing the regular timing of impact between the chain and the sprocket.

SUMMARY OF THE INVENTION

A chain and a chain and sprocket assembly for a roller, bush, or inverted tooth chain is disclosed, wherein the chain has link plates having a leading corner for interaction with a contact ring on the sprocket randomized with link plates having a different profile, thereby reducing noise by reducing chordal action and by breaking up the regular timing of roller-sprocket (or bushing-sprocket) and link plate-sprocket impact. Preferably, link plates are randomized on all links of the chain.

A chain is disclosed of a type for use with a first sprocket having a first sprocket center, a contact ring, and a plurality of teeth. The chain includes a plurality of first links, each first link including a first leading engagement element and a first link plate. Each first link plate has a first profile with a first leading corner. The first leading corner impacts the contact ring prior to a first impact between the first leading engagement element and the teeth, such that the first impact is delayed to a first degree. The chain also includes a plurality of second links, each second link comprising a second leading engagement element and a second link plate, each second link plate having a second profile different from the first profile. The first link plates and the second link plates are ordered in a sequence in the chain. In a preferred embodiment, the sequence is randomized. In another preferred embodiment, the sequence is determined based on noise simulation testing.

In one embodiment of the present invention, each second link plate has a second profile with a second leading corner.

The second leading corner impacts the contact ring prior to a second impact between the second leading engagement element and the teeth, such that the second impact is delayed to a second degree different than the first degree. In another embodiment, the chain further includes a plurality of third links, each third link further including a third leading engagement element and a third link plate. Each third link plate has a third profile without a leading corner, such that the third link plate does not contact the contact ring prior to a third impact between the third engagement element and the teeth. The first link plates, the second link plates, and the third link plates are ordered in the sequence. In one preferred embodiment, the first, second, and third link plates are ordered randomly in the sequence. In another preferred embodiment, the first, second, and third link plates are ordered in the sequence based on noise simulation testing.

In another embodiment of the present invention, each second link plate has a second profile without a leading corner, such that the second link plate does not contact the contact ring prior to a second impact between the second engagement element and the teeth.

A chain of the present invention is preferably a roller chain, a bush chain, or an inverted tooth chain. In one embodiment, the chain is a single-strand chain. In another embodiment, the chain is a multi-strand chain. In yet another embodiment, the chain travels from a second sprocket to the first sprocket along a travel line and wherein each first leading corner impacts the contact ring and delays the first impact until a tooth of the first sprocket directly ahead of the first link is at a selected position past a radial line from the first sprocket center perpendicular to the travel line. In another embodiment of the present invention, a chain and sprocket assembly includes a chain of the present invention and a first sprocket including a first sprocket center, a contact ring, and a plurality of teeth.

A method of decreasing noise in a chain and sprocket assembly is also disclosed. The method includes providing at least two sprockets, wherein at least one sprocket includes a plurality of teeth and a contact ring. The method further includes providing a plurality of first links, each first link comprising a first leading engagement element and a first link plate. Each first link plate has a first profile with a first leading corner, the first leading corner impacting the contact ring prior to a first impact between the first leading engagement element and the teeth. The method further includes providing a plurality of second links, each second link comprising a second leading engagement element and a second link plate, each second link plate having a second profile different from the first profile. The method further includes assembling a chain for use with the at least two sprockets, wherein the first link plates and the second link plates are ordered in a sequence in the chain. In a preferred embodiment, the sequence is randomized. In another preferred embodiment, the sequence is determined based on noise simulation testing. The chain is preferably a roller chain, a bush chain, or an inverted tooth chain.

DETAILED DESCRIPTION OF THE INVENTION

The present invention includes a chain with a randomized sequence of link plates in combination with a sprocket having a contact ring. Link plates having a leading corner for interaction with the sprocket contact ring are randomly interspersed with link plates having a different profile. "Random" and "randomized" are commonly used chain terms and, as used herein, are defined as meaning predetermined. Although the "random" sequence may be generated in a truly random way, once the sequence is determined, it is used from one chain to the next. More commonly, however, the "random" sequence is predetermined by a trial-and-error method such as noise simulation testing, where a sequence is repeatedly modified and tested for noise until a minimum or sufficiently low level of noise is achieved. This optimized sequence is then used as the randomized sequence. The combination of different link plates reduces chordal action and breaks up the regular timing of impact between components of the chain and the sprocket. Chordal action gives rise to undesirable oscillations and vibrations, which increase the operational noise of a chain and sprocket assembly. Regularly-timed impacts lead to an objectionable whine noise during operation of a chain and sprocket assembly. The present invention operates with a reduction of both types of noise.

Figure 1A:
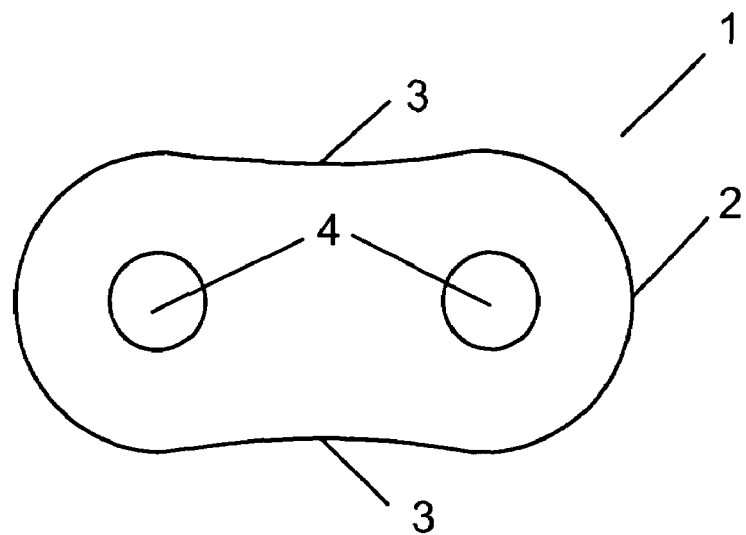
FIG. 1A shows a profile of a conventional prior art link plate with no leading corner.

Referring to FIG. 1A, a conventional prior art link plate (1) for a roller, bush, or inverted tooth chain has a generally oval external profile (2) with flat or slightly concave top and bottom surfaces (3). The link plate has two pin apertures (4). This simple link plate is designed to establish the pitch of the chain and hold the pins of the chain. The link plate (1) has no corners.

Figure 1B:
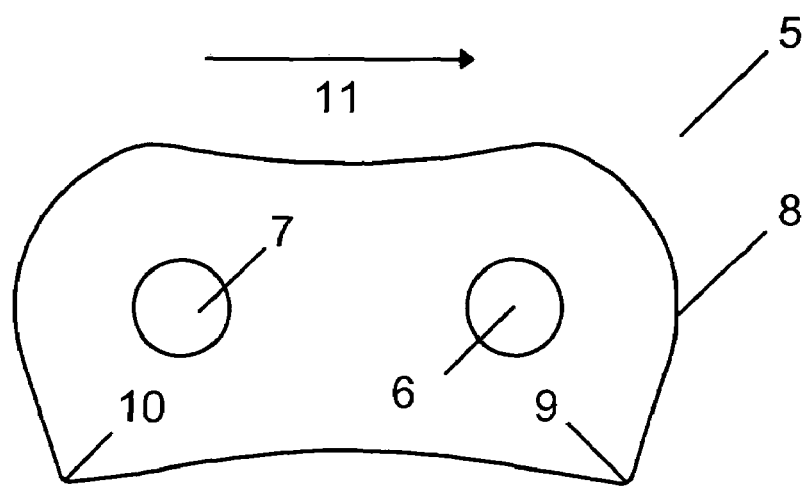
FIG. 1B shows a profile of a link plate with a leading corner.

Referring to FIG. 1B, a link plate (5) for a roller, bush, or inverted tooth chain of the present invention is shown. The link plate has two pin apertures (6) and (7). The link plate has a profile (8) similar to that in FIG. 1A, except material has been added to form two corners (9) and (10) for interacting with a sprocket contact ring. With the link plate in a chain and sprocket assembly moving to the right (11), the link plate (5) has a leading pin aperture (6), a trailing pin aperture (7), and a leading corner (9). In an assembled roller chain, the leading roller of the link is mounted onto a bushing, which in turn is mounted onto a pin through the leading pin aperture (6). In a bush chain, the leading bushing of the link plate (5) is mounted onto a pin through the leading pin aperture (6). In an inverted tooth chain, the leading tooth of the link is closest to the leading pin aperture (6). The term "leading engagement element" is used to represent any of these leading elements, which contact the sprocket and engage the chain with the sprocket.

Figure 1C:
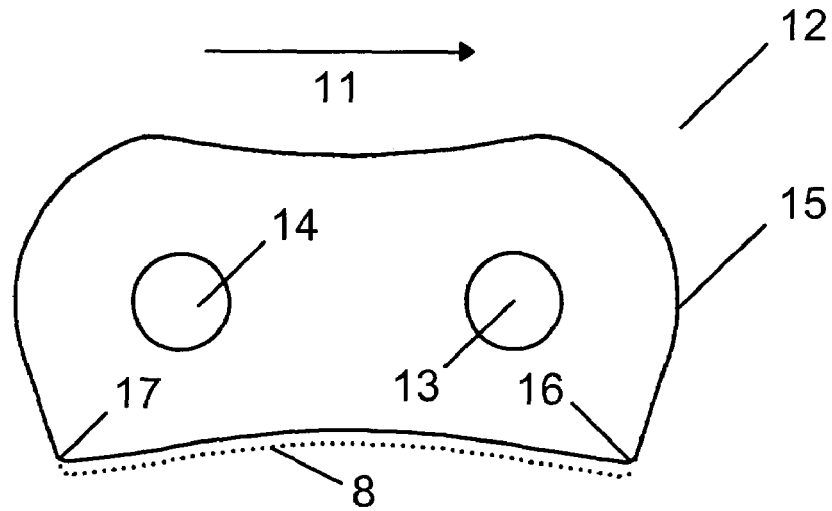
FIG. 1C shows a second link plate with a leading corner and a different profile than the link plate of FIG. 1B.

Referring to FIG. 1C, another link plate (12) for a roller, bush, or inverted tooth chain of the present invention is shown. The link plate has two pin apertures (13) and (14). The link plate has a profile (15) similar to that in FIG. 1B and two corners (16) and (17) for interacting with a sprocket contact ring. The dotted line (8) shows where the profile (8) of the link plate (5) of FIG. 1B deviates from the profile (15) of the link plate (12) of FIG. 1C. The link plate (12) of FIG. 1C is smaller than the link plate (5) of FIG. 1B, such that its leading corner (16) contacts the sprocket contact ring later and its leading engagement element engages the sprocket earlier than that of the link plate of FIG. 1B. With the link plate in a chain and sprocket assembly moving to the right (11), the link plate (12) has a leading pin aperture (13), a trailing pin aperture (14), and a leading corner (16). In an assembled roller chain, the leading roller of the link is mounted onto a bushing, which in turn is mounted onto a pin through the leading pin aperture (13). In a bush chain, the leading bushing of the link plate (12) is mounted onto a pin through the leading pin aperture (13). In an inverted tooth chain, the leading tooth of the link is closest to the leading pin aperture (13).

Figure 1D:
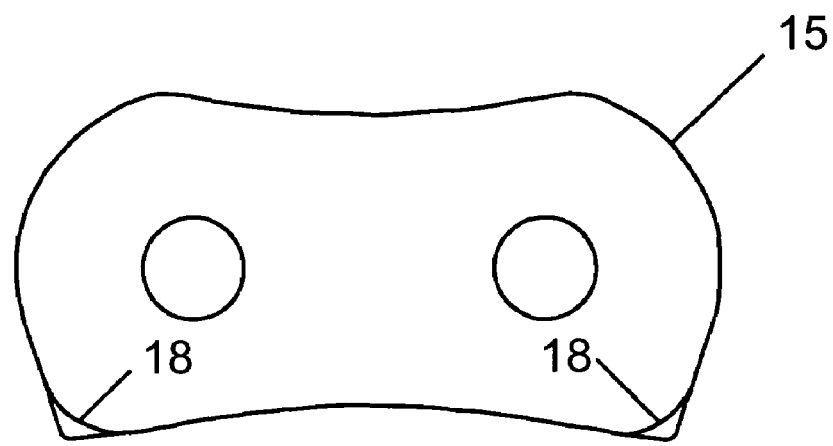
FIG. 1D shows another example of a link plate with a leading corner of the present invention.
Figure 1E:
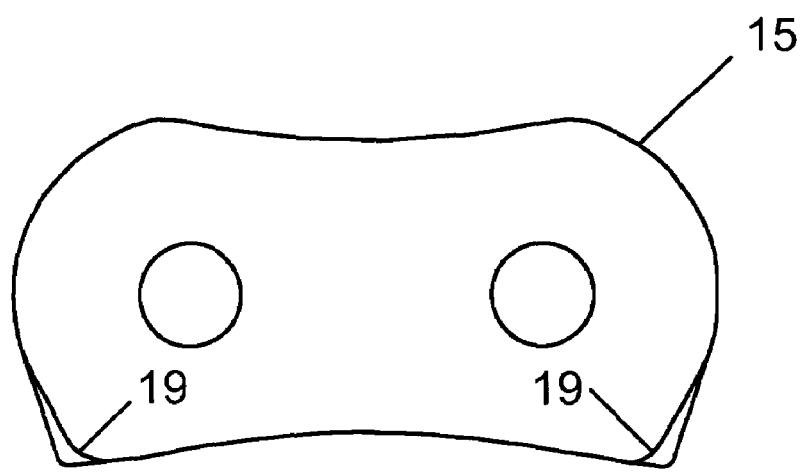
FIG. 1E shows another example of a link plate with a leading corner of the present invention.
Figure 1F:
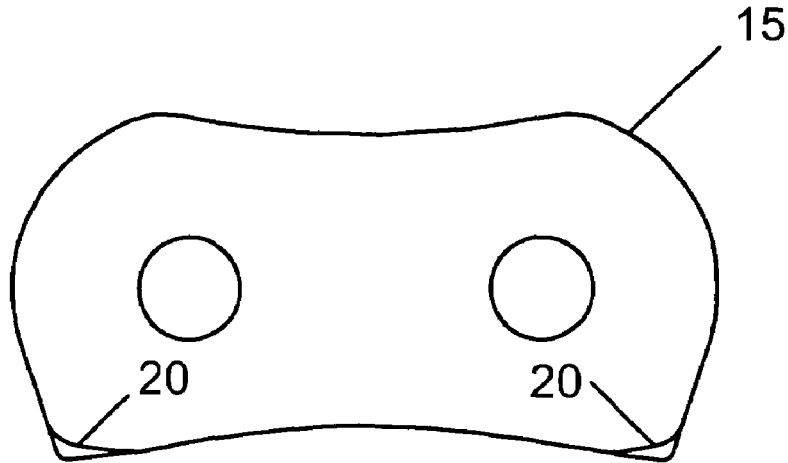
FIG. 1F shows another example of a link plate with a leading corner of the present invention.

Referring to FIG. 1D through FIG. 1F, representative examples of other types of link plate profiles with leading corners for use in the present invention are shown. The link plate profiles are designed to reduce chordal action in the chain. In each case, the corners have a different shape, and the profile is shown in comparison to the profile (15) of the link plate of FIG. 1C. In FIG. 1D, the corners (18) are more rounded than in the previous link plate. In FIG. 1E, the corners (19) are closer together. In FIG. 1F, the corners (20) are higher and slightly closer together. Each of these alterations affects when the link plate contacts the sprocket contact ring and when the leading engagement element contacts the sprocket. FIG. 1B through FIG. 1F are only representative of the types of link plate profiles with leading corners that are used in embodiments of the present invention. Many other profiles may be used without deviating from the spirit of the invention.

For illustrative purposes, the chain of the chain and sprocket assembly in embodiments of the present invention is shown as a single-strand roller chain in FIG. 2 through FIG. 8. The invention is also applicable to a bush chain and an inverted tooth chain. The invention is also applicable to a multi-strand chain.

A chain of the present invention preferably has all of the links randomized. For clarity and simplicity, however, only link plates from alternating links of the chain of the chain and sprocket assembly in embodiments of the present invention are shown in FIG. 2 through FIG. 8. In FIG. 9 a link plate from each of the links of a section of the chain is shown in order to illustrate the full effect of randomization of all of the links.

Figure 2:
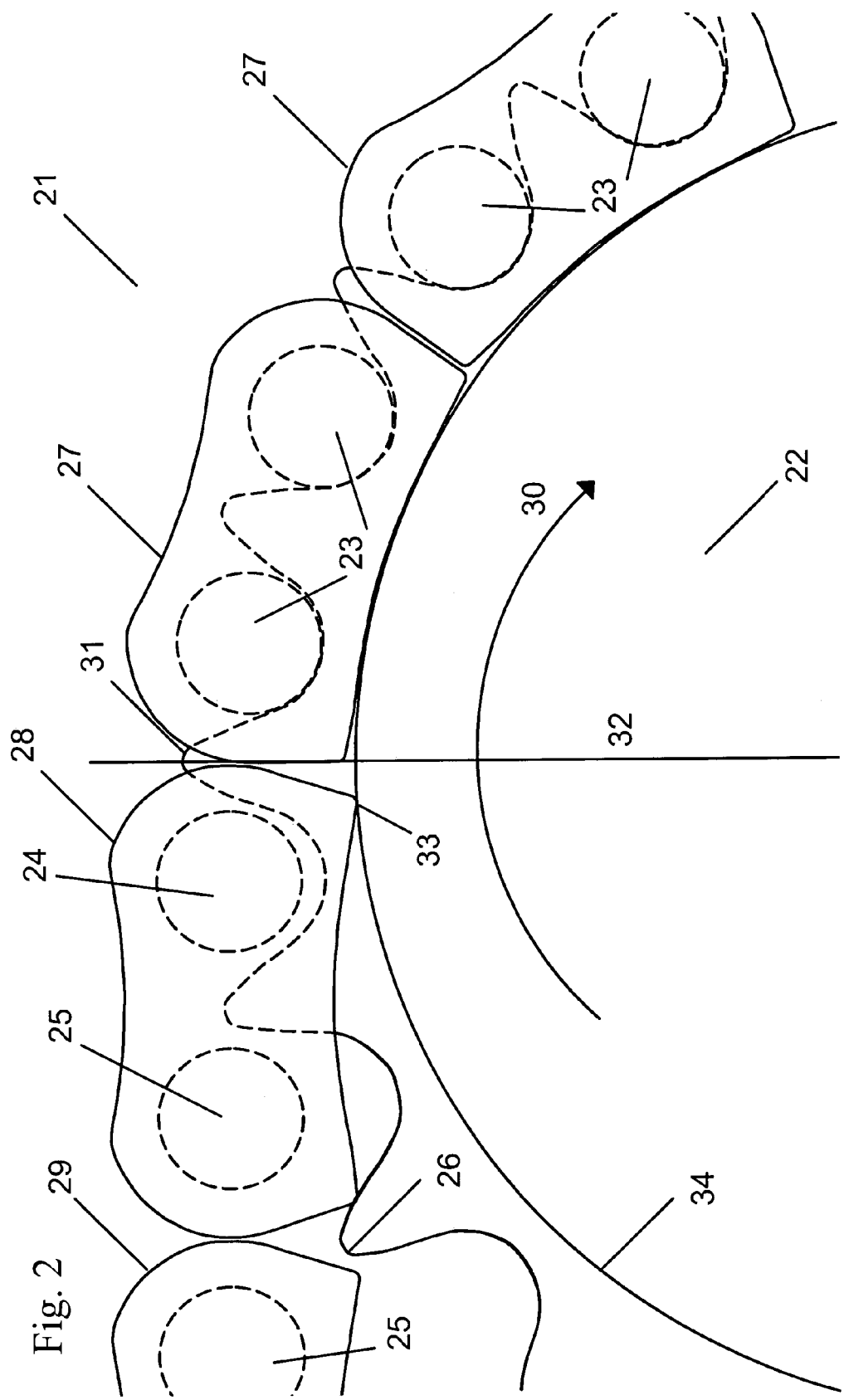
FIG. 2 shows a side view of the leading corner of a roller chain link plate of FIG. 1B contacting a sprocket contact ring.

When a roller chain containing the link plates of FIG. 1B is used with a sprocket having a contact ring, the impact between the rollers and the sprocket is delayed and chordal action is reduced. Referring to FIG. 2, part of a roller chain (21) is shown engaging a sprocket (22) by intermeshing its rollers (23), (24), and (25) with the teeth (26) of the sprocket (22). The roller chain (21) is shown schematically as a series of link plates (27), (28), and (29) with leading corners, as previously described in FIG. 1B. Only link plates from alternating links are shown. The second sprocket of the chain and sprocket assembly, not shown in FIG. 2, is located, such that the travel line of the chain from the second sprocket to the shown sprocket (22) is horizontal. A travel line is hereby defined herein as a line formed by the chain, when it is taut between two sprockets. With the sprocket (22) rotating in a clockwise direction (30), when the tooth (31) directly in front of a link plate (28) is aligned with a radial line (32) going vertically upward from the sprocket (22) center, the leading corner (33) of the link plate (28) is in contact with the sprocket contact ring (34). This lifts the link to a higher vertical path than it would otherwise take during engagement, thereby reducing chordal action and vibrational noise during operation. If the link plate profile were such that no contact occurred between the link plate and the contact ring, at this sprocket position, the engagement element (24) would have already contacted the leading side of the sprocket tooth space. The interaction also delays the impact between the leading roller (24) and the sprocket (22).

Figure 3:
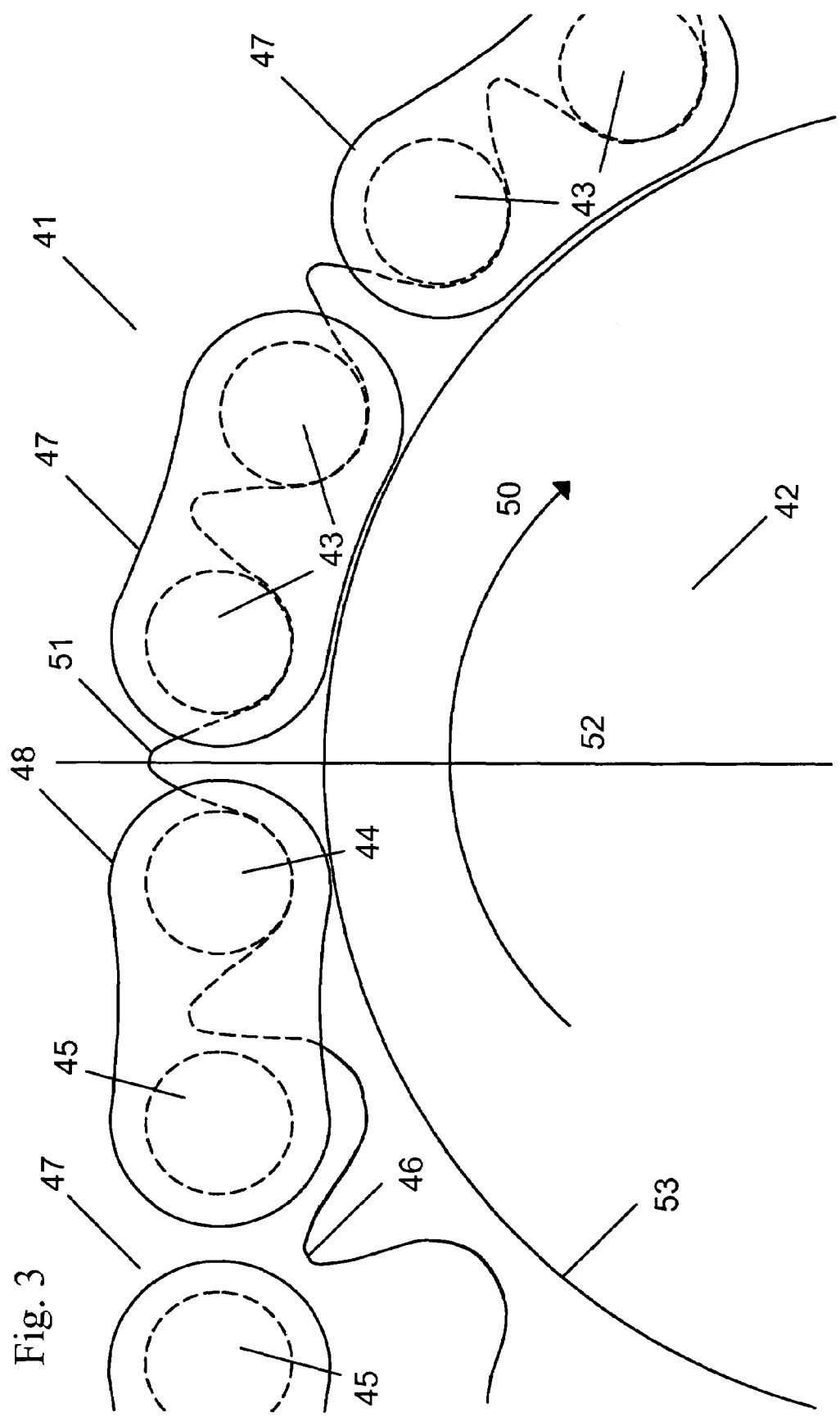
FIG. 3 shows a side view of a roller chain with a link plate of FIG. 1A with no contact occurring between the link plate and a contact ring.

When a roller chain containing the link plates of FIG. 1A is used with a sprocket having a contact ring, the chain does not interact with the contact ring. Referring to FIG. 3, part of a roller chain (41) is shown engaging a sprocket (42) by intermeshing its rollers (43), (44), and (45) with the teeth (46) of the sprocket (42). The roller chain (41) is shown schematically as a series of conventional link plates (47), (48), and (49), as previously described in FIG. 1A. Only link plates from alternating links are shown. The second sprocket of the chain and sprocket assembly, not shown in FIG. 3, is located, such that the travel line of the chain from the second sprocket to the shown sprocket (42) is horizontal. With the sprocket (42) rotating in a clockwise direction (50), when the tooth (51) directly in front of a link plate (48) is aligned with a radial line (52) going vertically upward from the sprocket (42) center, the leading roller (44) of the link plate (48) engages the sprocket (42). The conventional link plate (48) has no leading corner and does not contact the sprocket contact ring (53) prior to impact between its leading roller (34) and the sprocket (32). Chordal action arises in this assembly, because as the sprocket (42) rotates from the position of FIG. 3 to a position with the roller centered on the radial line (52), it rises vertically before lowering past the radial point. This vertical up-and-down motion creates vibrations in the trailing free part of the chain (41), leading to operational noise.

Figure 4:
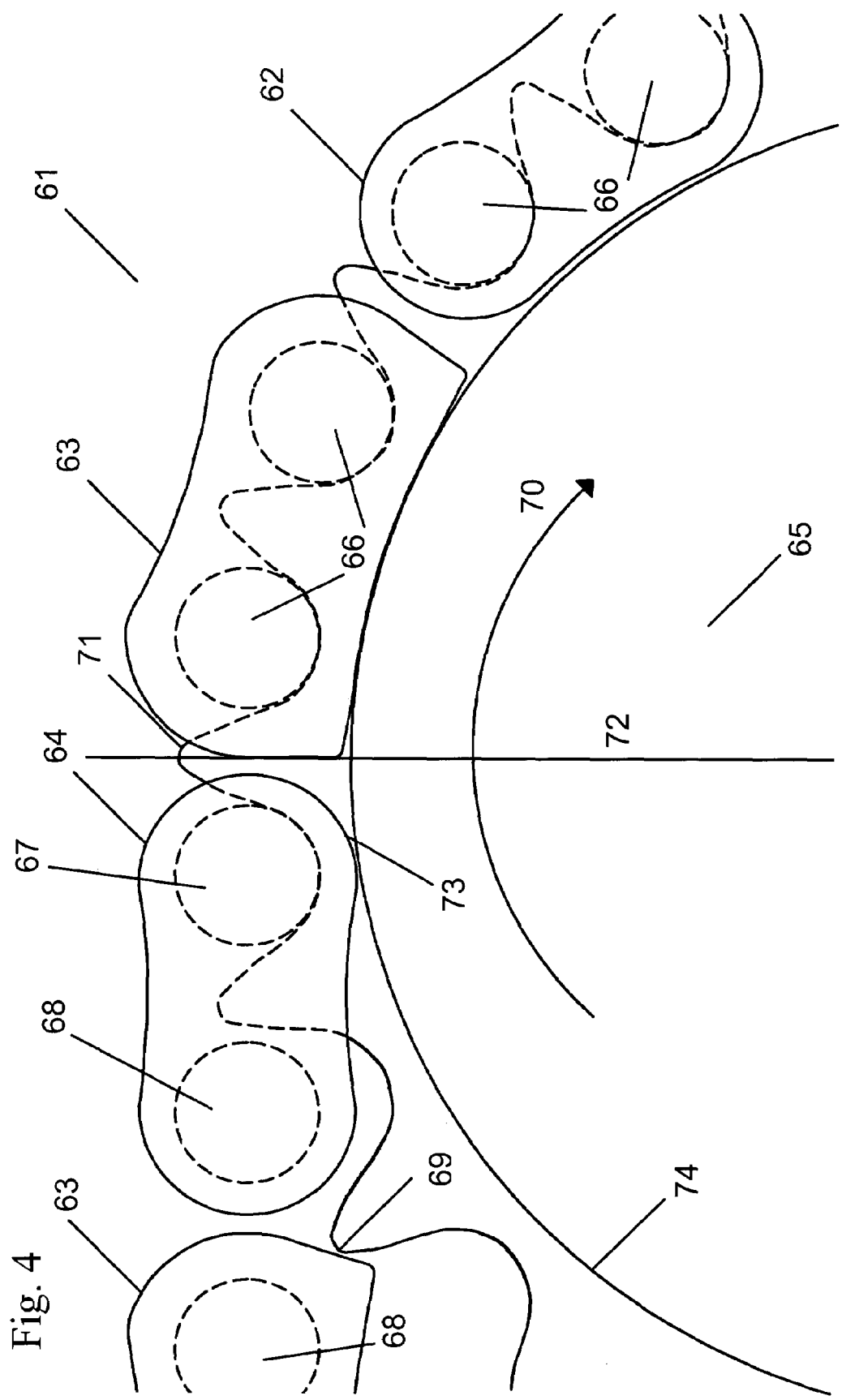
FIG. 4 shows a side view of an embodiment of the present invention with a conventional link plate accompanying the leading roller.
Figure 5:
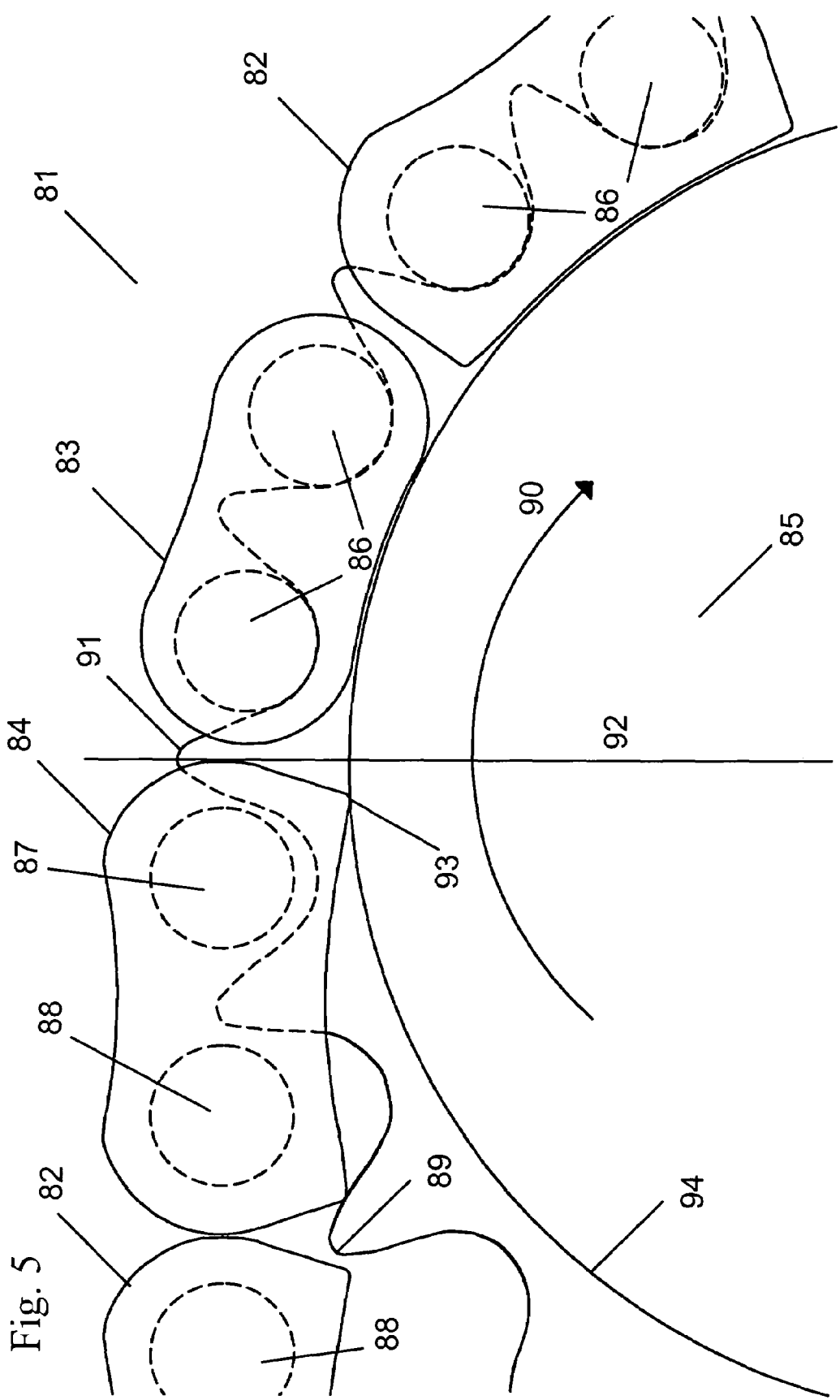
FIG. 5 shows a side view of an embodiment of the present invention with a link plate with a leading corner accompanying the leading roller.
Figure 6:
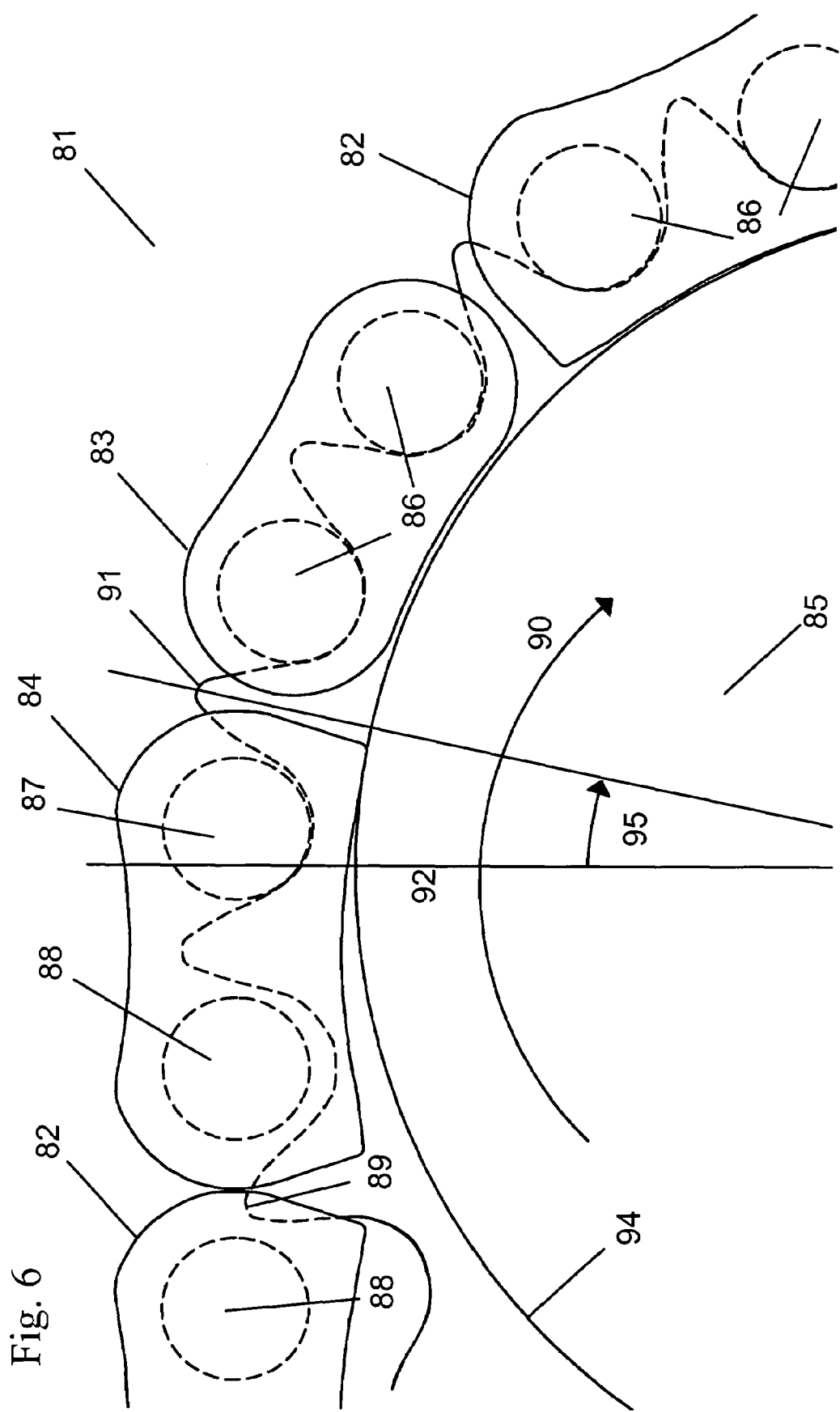
FIG. 6 shows the embodiment of the present invention of FIG. 5 with a clockwise rotation of the sprocket relative to FIG. 5.

While the specific link plate profiles (2) and (5) of FIG. 1A and FIG. 1B are shown in FIG. 4 through FIG. 6 for illustrative purposes, other combinations of link plate designs, such as the link plates of FIGS. 1C through 1F, are used without deviating from the spirit of the invention. The leading corner is located farther from the leading pin aperture than the edge of the conventional link plate, so that the link plate with a leading corner contacts the contact ring at certain points during travel, while the conventional link plate does not. Within this limitation, however, many alternative profiles for both types of link plates are encompassed by the present invention.

Although specific link plate sequences are shown in FIG. 4 through FIG. 9 these sequences were chosen for illustrative purposes only and are not intended to place a limitation on the number of random sequences within the scope of the present invention. For example, FIG. 4 shows a sequence of four link plates chosen from two different link plate profiles. The number of different random sequences is $X^N$, where X is the number of different link plate profiles randomized and N is the number of links in the sequence. For the chain in FIG. 4, the shown sequence of four link plates is one of $2^4$, or 16, different sequences of four link plates, which could be found in the chain. In other words, if four link plates from a different section of the chain were shown, the sequence could be one of any of these 16 sequences. The sequence of FIG. 4 was chosen, in part, to illustrate what happens when a link with a conventional link plate engages a sprocket. The sequence of FIG. 5 and FIG. 6 was chosen, in part, to illustrate what happens when a link of FIG. 1B engages a sprocket. The sequences of FIG. 7 through FIG. 9 were chosen, in part, to illustrate what happens when a link of FIG. 1C engages a sprocket.

Referring to FIG. 4, part of a roller chain (61) with randomized link plates (62), (63), and (64) and a sprocket (65) of the present invention is shown, where conventional link plates (62) and (64) have been randomly placed in the link plate sequence of the roller chain (61). For simplicity, only link plates from alternating links are shown, although all of the links are preferably randomized in the present invention. Two of the link plates (62) and (64) are equivalent to the link plate (1) shown in FIG. 1A, while the other two link plates (63) are equivalent to the link plate (11) shown in FIG. 1B. FIG. 4 shows one of many possible sequences of four link plates (62), (63), and (64) within a randomized roller chain (61). A randomized roller chain (61) of the present invention engages a sprocket (65) by intermeshing its rollers (66), (67), and (68) with the teeth (69) of the sprocket (65). The roller chain (61) is shown schematically as a series of link plates (62), (63), and (64). The second sprocket of the chain and sprocket assembly, not shown in FIG. 4, is located, such that the travel line of the chain from the second sprocket to the shown sprocket (65) is horizontal. With the sprocket (65) rotating in a clockwise direction (70), when the tooth (71) directly in front of a link plate (64) is aligned with a radial line (72) going vertically upward from the sprocket (65) center, the leading roller (67) of the link plate (64) engages the sprocket (65). The conventional link plate (64) has no leading corner (73) and does not contact the sprocket contact ring (74) prior to impact between its leading roller (67) and the sprocket (65).

FIG. 5 shows a randomized roller chain (81) of the present invention with another of many possible randomized sequences of four link plates (82), (83), and (84). In contrast to FIG. 4, the engaging link plate (84) is a link plate as in FIG. 1B rather than FIG. 1A. For simplicity, only link plates from alternating links are shown, although all of the links are preferably randomized in the present invention. Part of a roller chain (81) is shown engaging a sprocket (85) by intermeshing its rollers (86), (87), and (88) with the teeth (89) of the sprocket (85). One of the link plates (83) is equivalent to the link plate (1) shown in FIG. 1A, while the other three link plates (82) and (84) are equivalent to the link plate (11) shown in FIG. 1B. FIG. 5 shows one of many possible sequences of four link plates (82), (83), and (84) within a randomized roller chain (81). The second sprocket of the chain and sprocket assembly, not shown in FIG. 5, is located, such that the travel line of the chain from the second sprocket to the shown sprocket (85) is horizontal. With the sprocket (85) rotating in a clockwise direction (90), when the tooth (91) directly in front of a link plate (84) is aligned with a radial line (92) going vertically upward from the sprocket (85) center, the leading corner (93) of the link plate (84) is in contact with the sprocket contact ring (94). At this position, the leading roller (87) has not yet contacted the sprocket (85), and the link is lifted to a higher vertical path than it would otherwise take during engagement, thereby reducing chordal action and vibrational noise during operation. Thus, the impact between the leading roller (87) and the sprocket (85) is delayed.

Referring to FIG. 6, the same part of the roller chain (81) and sprocket (85) assembly of FIG. 5 is shown. FIG. 6 shows the assembly of FIG. 5, where the sprocket (85) has been rotated substantially (95) in the clockwise direction (90) in relation to FIG. 5. For simplicity, only link plates from alternating links are shown, although all of the links are preferably randomized in the present invention. With the sprocket (85) rotating in a clockwise direction (90), when a tooth (91) is substantially (95) past the radial line (92) perpendicular to the sprocket-sprocket centerline, the leading roller (87) of the engaging link plate (84) engages the sprocket (85). The specific angle (95) of rotation is dependent on the geometry of the system and a range of degrees is possible. This impact is delayed and occurs substantially later than when a link plate of FIG. 1A is in the position of the link plate (84). The link plate (84) is still in contact with the sprocket contact ring (94) at this position.

Based on the geometry of the leading corner and its relation to the leading engagement element and the sprocket, the impact of the leading engagement element with the sprocket is delayed by a specific articulation angle for each link plate profile. Changing the shape of the link plate leading corner profile, such as in the examples of FIG. 1B through FIG. 1F, changes the articulation angle, such that a range of articulation angles is possible. The maximum articulation angle is 360/N degrees, where N is the number of sprocket teeth. Although in the present invention the articulation angle may be any angle from 0 to 360/N degrees, a preferred range for delaying impact is 15 to 85 percent of the maximum articulation angle. As an example, if the system has a sprocket with twenty teeth, the maximum articulation angle is (360/20) or 18 degrees. The preferred range of articulation angles in this example is 2.7 to 15.3 degrees.

Figure 7:
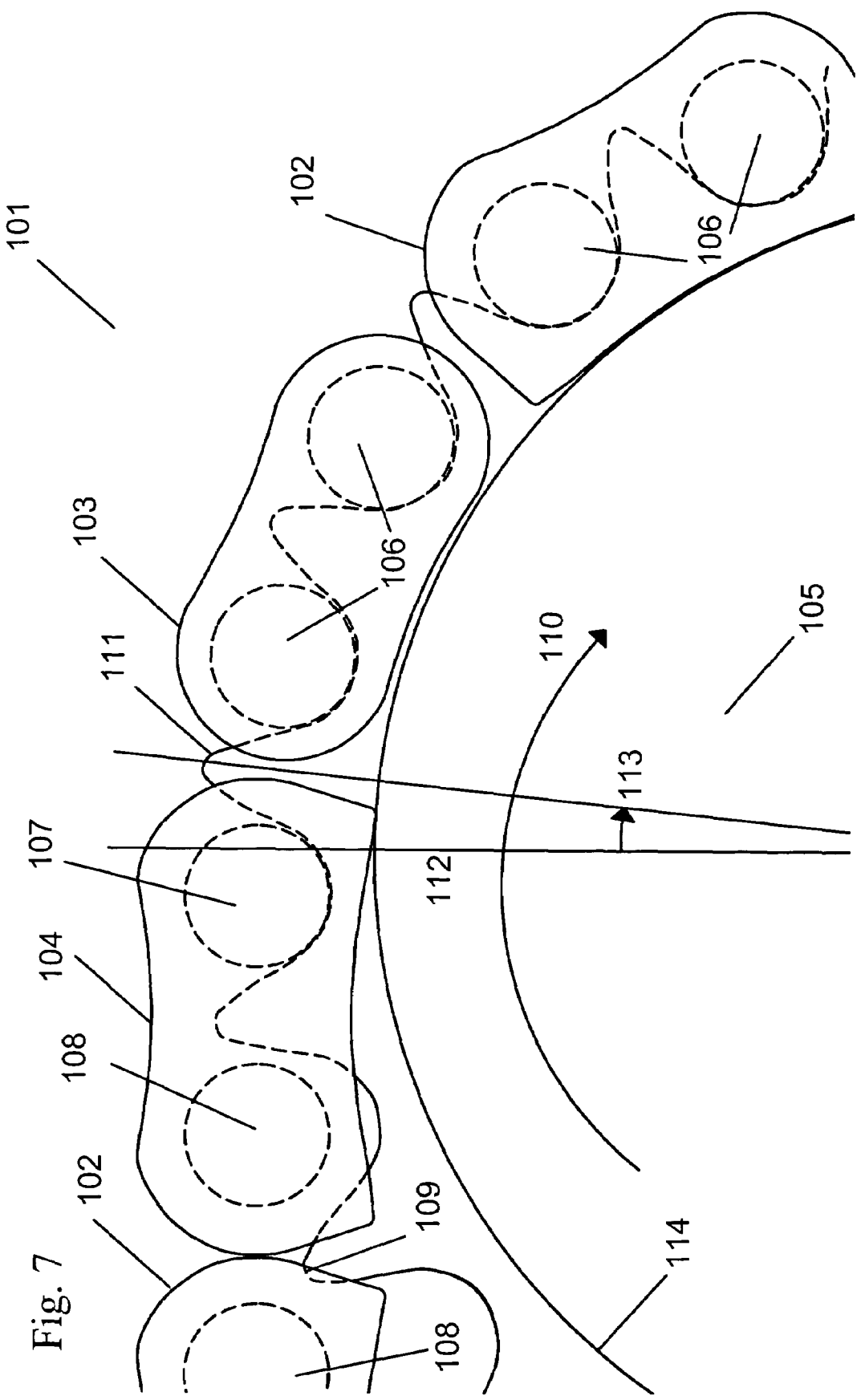
FIG. 7 shows a side view of an embodiment of the present invention with two types of link plates with leading corners and a third type of link plate with no leading corner.

FIG. 7 shows a randomized roller chain (101) with link plates of FIG. 1B (102), FIG. 1A (103), and FIG. 1C (104) in another embodiment of the present invention. The engaging link plate (104) is a link plate as in FIG. 1C. For simplicity, only link plates from alternating links are shown, although all of the links are preferably randomized in the present invention. Part of a roller chain (101) is shown engaging a sprocket (105) by intermeshing its rollers (106), (107), and (108) with the teeth (109) of the sprocket (105). FIG. 7 shows one of many possible sequences of four link plates (102), (103), and (104) within a randomized roller chain (101). The second sprocket of the chain and sprocket assembly, not shown in FIG. 7, is located, such that the travel line of the chain from the second sprocket to the shown sprocket (105) is horizontal. With the sprocket (105) rotating in a clockwise direction (110), when a tooth (111) is substantially (113) past the radial line (112) perpendicular to the sprocket-sprocket centerline, the leading roller (107) of the engaging link plate (104) engages the sprocket (105). The angle (113) of rotation is dependent on the geometry of the system and a range of degrees is possible. Thus, the timing of impact between the leading roller and the sprocket is different for all three link plate types (102), (103), and (104), thereby breaking up a regular impact between the leading rollers and the sprocket and between the leading corners and the sprocket contact ring (114) during operation. Chordal action is reduced by the lift-up effect provided by the contact between the leading corners and the sprocket contact ring.

Figure 8:
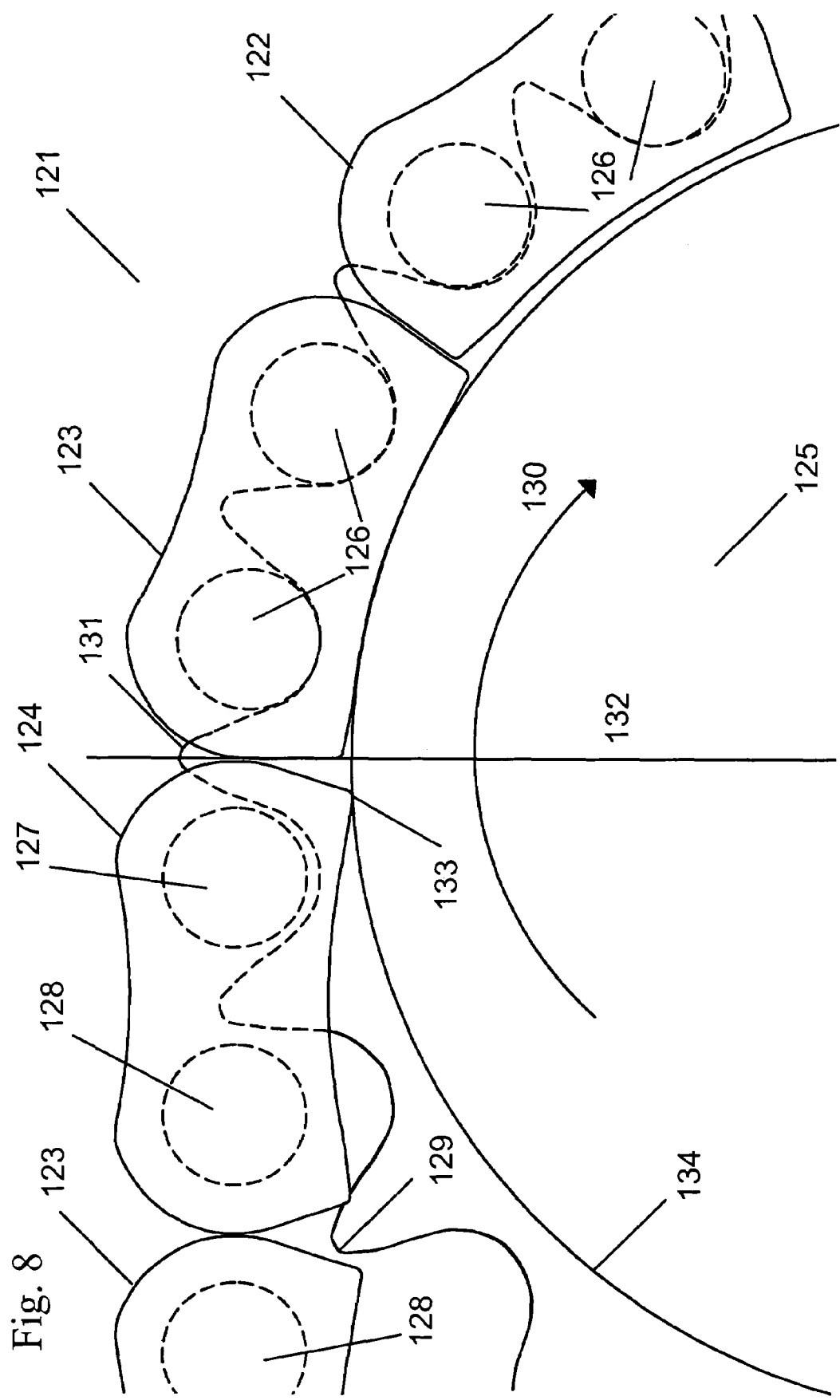
FIG. 8 shows a side view of an embodiment of the present invention with two types of link plates with leading corners.
Figure 9:
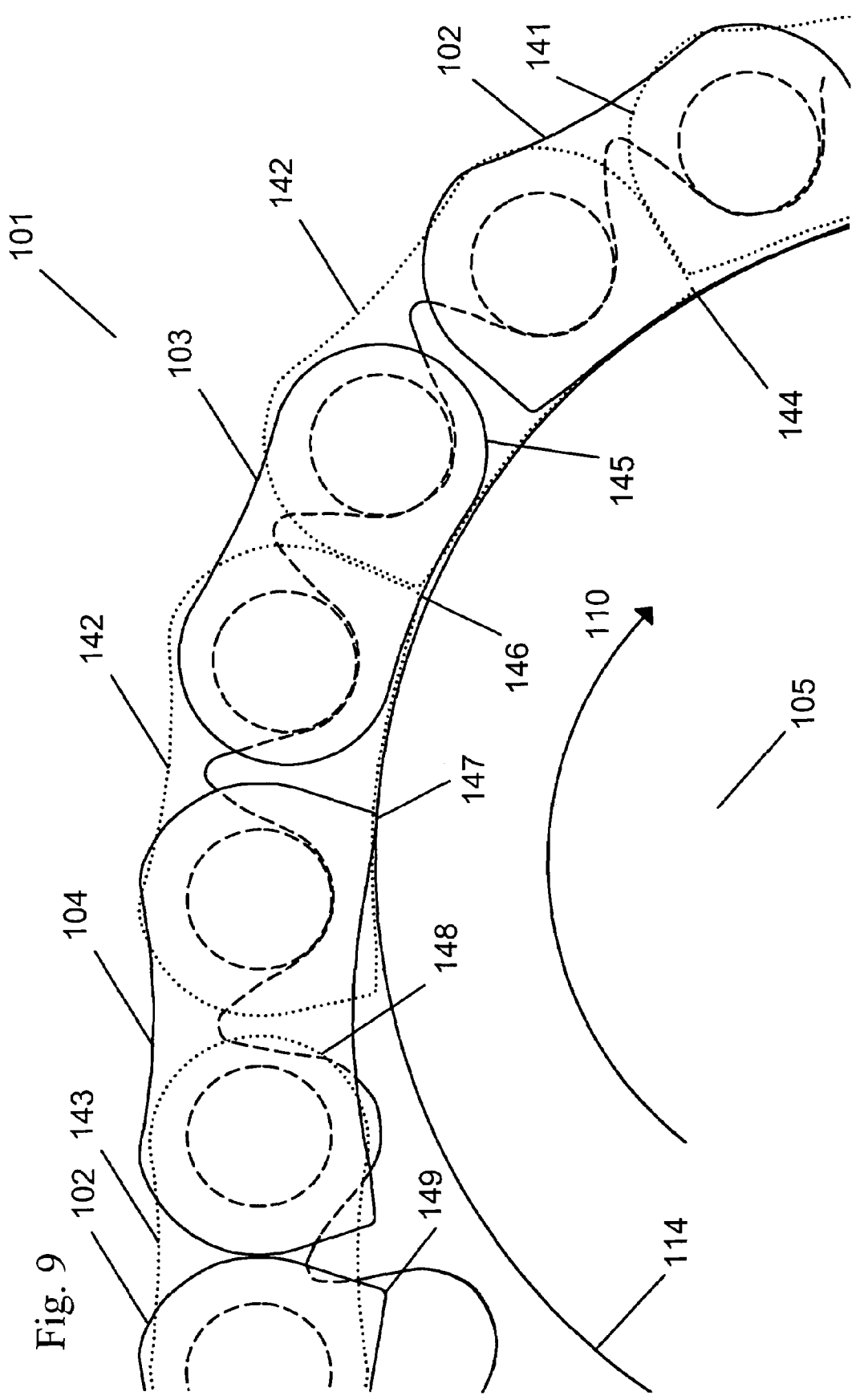
FIG. 9 shows the chain of FIG. 7 with link plates from all of the links in the section of the chain shown.

FIG. 8 shows a randomized roller chain (121) with link plates of FIG. 1B (123) and FIG. 1C (122) and (124) in another embodiment of the present invention. In this embodiment, all of the link plates in the randomized sequence have leading corners for contacting the sprocket contact ring (134). For simplicity, only link plates from alternating links are shown, although all of the links are preferably randomized in the present invention. Part of a roller chain (121) is shown engaging a sprocket (125) by intermeshing its rollers (126), (127), and (128) with the teeth (129) of the sprocket (125). FIG. 8 shows one of many possible sequences of four link plates (122), (123), and (124) within a randomized roller chain (121). The second sprocket of the chain and sprocket assembly, not shown in FIG. 8, is located, such that the travel line of the chain from the second sprocket to the shown sprocket (125) is horizontal. With the sprocket (125) rotating in a clockwise direction (130), when the tooth (131) directly in front of a link plate (124) is aligned with a radial line (132) going vertically upward from the sprocket (125) center, the leading corner (133) of the link plate (124) is in contact with the sprocket contact ring (134). At this position, the leading roller (127) has not yet contacted the sprocket (125). Thus, the link is lifted as a result of contact with the contact ring and the impact between the leading roller (127) and the sprocket (125) is delayed, but to a lesser extent than when a link plate (123) of FIG. 1B is in this position. Chordal action is reduced, and a regular impact between the leading rollers and the sprocket and between the leading corners and the sprocket contact ring (114) is broken up during operation.

FIG. 9 shows randomized link plates from all links of a section of a chain in order to illustrate the full scope of the present invention. FIG. 9 shows the same chain (101) as shown in FIG. 7, but in FIG. 9 a link plate (102), (103), (104), (141), (142), and (143) from each link is shown rather than only link plates (102), (103), and (104) from alternating links. Profiles of the alternating links are shown with dotted lines for clarity. The configuration of the chain and sprocket is such that a leading corner from each of the link plates having leading corners in FIG. 9 is able to contact the contact ring prior to the impact of the leading engagement element of the link. Link plates of eight different links are shown in whole or in part in FIG. 9. The series of shown link plates, in order from right to left, are from FIG. 1C, FIG. 1B, FIG. 1B, FIG. 1A, FIG. 1B, FIG. 1C, FIG. 1A, FIG. 1B, but as with the previous figures, this sequence is one of many possible randomized sequences. Each of the previous embodiments of the present invention could be shown in this way and the chain of FIG. 7 was chosen only as a representative example. In preferred embodiments of the present invention, link plates from all of the links of the chain are randomized.

FIG. 9 clarifies that the impact of each engagement element with the sprocket can be delayed and that a full realization of the principles of the present invention requires randomization of link plates from each link of the chain. The leading edges of six link plates of six consecutive links are shown in FIG. 9. The sequence of leading corners (144), (145), (146), (147), (148), and (149) is such that the link with a leading corner (144), the link with no leading corner (145), and the link with the leading corner (146) have already engaged the sprocket (105) in the position shown in FIG. 9. The next link (104) is engaging the sprocket with the leading corner (147) contacting the sprocket contact ring (114), and the link with no leading corner (148) and the link with the leading corner (149) are about to engage the sprocket.

Objectionable chain system whine noise is significantly attenuated by breaking up the regular timing of leading engagement elements impacting the sprocket teeth. This is accomplished by using a chain including a randomized sequence of link plates with leading corners and link plates with a different profile. The different profile is preferably different such that the leading corner, if present, contacts the contact ring with a different timing and the impact between the leading engagement element and the sprocket is delayed to a different angle. Incorporation of the leading corners into a chain produces a significant delay in the timing of roller-sprocket (or bushing-sprocket) impact, because the link plate outer contour contacts a sprocket contact ring prior to the impact between the leading engagement element and the sprocket.

Both the regular impact frequency between leading engagement elements and the sprocket and between link plates and the sprocket contact ring produce an objectionable whine noise. The roller chain of the present invention includes a randomized sequence of link plates to break up the regular timing of both types of impacts, thereby reducing the objectionable system noise. The lift-up provided by contact between leading corners and the sprocket contact ring reduces chordal action and the associated vibrational noise.

Although the link plates in FIG. 1B (5) and FIG. 1C (12) are shown with two corners (9), (10), (16), and (17), FIG. 2 through FIG. 9 demonstrate that only the leading corner (9), (16), (33), (93), and (133) needs to be present for delay of the leading engagement element-sprocket impact. Additional corners provide balance to the link plate structure and allow the chain to be arranged on the sprockets in multiple orientations without loss of a leading corner. An altered link plate of the present invention with one, two, three, or four leading corners does not deviate from the spirit of the invention.

Additionally, although the chains in FIG. 4 through FIG. 8 are described as roller chains, the present invention is equally applicable to bush chain and inverted tooth chain and sprocket systems. The sprocket contact ring and the link plate with a leading corner are adaptable to all three of these types of chains to reduce chordal action, and the additional randomization of link plates with link plates including a leading corner is incorporated to break up the regular timing of impact between the chain and the sprocket to reduce the resulting operational whine noise.

Although the chains in FIG. 4 through FIG. 8 are depicted as single-strand chains in a two-sprocket arrangement, the present invention is equally applicable to multi-strand chains and arrangements with more than two sprockets.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A chain of a type for use with a first sprocket having a first sprocket center, a contact ring, and a plurality of teeth, wherein the chain comprises:
    a plurality of first links, each first link comprising a first leading engagement element and a first link plate, each first link plate having a first profile with a first leading corner, the first leading corner impacting the contact ring prior to a first impact between the first leading engagement element and the teeth, such that the first impact is delayed to a first degree; and
    a plurality of second links, each second link comprising a second leading engagement element and a second link plate, each second link plate having a second profile different from the first profile;
    wherein the first link plates and the second link plates are ordered in a sequence in the chain.

2. The chain of claim 1, wherein each second link plate has a second leading corner, the second leading corner impacting the contact ring prior to a second impact between the second leading engagement element and the teeth, such that the second impact is delayed to a second degree different than the first degree.

3. The chain of claim 2, further comprising a plurality of third links, each third link comprising a third leading engagement element and a third link plate, each third link plate having a third profile without a leading corner, such that the third link plate does not contact the contact ring prior to a third impact between the third leading engagement element and the teeth, wherein the first link plates, the second link plates, and the third link plates are ordered in the sequence.

4. The chain of claim 3, wherein the first, second, and third link plates are ordered randomly in the sequence.

5. The chain of claim 3, wherein the first, second, and third link plates are ordered in the sequence as predetermined by noise simulation testing.

6. The chain of claim 1, wherein each second link plate has a second profile without a leading corner, such that the second link plate does not contact the contact ring prior to a second impact between the second leading engagement element and the teeth.

7. The chain of claim 1, wherein the sequence is randomized.

8. The chain of claim 1, wherein the sequence is predetermined by noise simulation testing.

9. The chain of claim 1, wherein the chain is selected from the group consisting of:
   a) a roller chain;
   b) a bush chain; and
   c) an inverted tooth chain.

10. The chain of claim 1, wherein the chain is a single-strand chain.

11. The chain of claim 1, wherein the chain is a multi-strand chain.

12. The chain of claim 1, wherein the chain travels from a second sprocket to the first sprocket along a travel line and wherein each first leading corner impacts the contact ring and delays the first impact until a tooth of the first sprocket directly ahead of the first link is at a selected position past a radial line from the first sprocket center perpendicular to the travel line.

13. A chain and sprocket assembly, the assembly comprising:
   a first sprocket including a first sprocket center, a contact ring, and a plurality of teeth; and
   a chain comprising:
      a plurality of first links, each first link comprising a first leading engagement element and a first link plate, each first link plate having a first profile with a first leading corner, the first leading corner impacting the contact ring prior to a first impact between the first leading engagement element and the teeth, such that the first impact is delayed to a first degree; and
      a plurality of second links, each second link comprising a second leading engagement element and a second link plate, each second link plate having a second profile different from the first profile;
   wherein the first link plates and the second link plates are ordered in a sequence in the chain.

14. The assembly of claim 13, wherein each second link plate has a second leading corner, the second leading corner impacting the contact ring prior to a second impact between the second leading engagement element and the teeth, such that the second impact is delayed to a second degree different than the first degree.

15. The assembly of claim 14, further comprising a plurality of third links, each third link comprising a third leading engagement element and a third link plate, each third link plate having a third profile without a leading corner, such that the third link plate does not contact the contact ring prior to a third impact between the third leading engagement element and the teeth, wherein the first link plates, the second link plates, and the third link plates are ordered in the sequence.

16. The assembly of claim 15, wherein the first, second, and third link plates are ordered randomly in the sequence.

17. The assembly of claim 15, wherein the first, second, and third link plates are ordered in the sequence as predetermined by noise simulation testing.

18. The assembly of claim 13, wherein each second link plate has a second profile without a leading corner, such that the second link plate does not contact the contact ring prior to a second impact between the second leading engagement element and the teeth.

19. The assembly of claim 13, wherein the sequence is randomized.

20. The assembly of claim 13, wherein the sequence is predetermined by noise simulation testing.

21. The assembly of claim 13, wherein the chain is selected from the group consisting of:
   a) a roller chain;
   b) a bush chain; and
   c) an inverted tooth chain.

22. The assembly of claim 13, wherein the chain is a single-strand chain.

23. The assembly of claim 13, wherein the chain is a multi-strand chain.

24. The assembly of claim 13, wherein the chain travels from a second sprocket to the first sprocket along a travel line and wherein each first leading corner impacts the contact ring and delays the first impact until a tooth of the first sprocket directly ahead of the first link is at a selected position past a radial line from the first sprocket center perpendicular to the travel line.

25. A method of decreasing noise in a chain and sprocket assembly comprising the steps of:
   a) providing at least two sprockets, wherein at least one sprocket includes a plurality of teeth and a contact ring;
   b) providing a plurality of first links, each first link comprising a first leading engagement element and a first link plate, each first link plate having a first profile with a first leading corner, the first leading corner impacting the contact ring prior to a first impact between the first leading engagement element and the teeth;
   c) providing a plurality of second links, each second link comprising a second leading engagement element and a second link plate, each second link plate having a second profile different from the first profile; and
   d) assembling a chain for use with the at least two sprockets, wherein the first link plates and the second link plates are ordered in a sequence in the chain.

26. The method of claim 25, wherein the sequence is randomized.

27. The method of claim 25, wherein the sequence is predetermined by noise simulation testing.

28. The method of claim 25, wherein the chain is selected from the group consisting of:
   a) a roller chain;
   b) a bush chain; and
   c) an inverted tooth chain.

* * * * *